US012534939B2

(12) United States Patent
Devernois

(10) Patent No.: US 12,534,939 B2
(45) Date of Patent: Jan. 27, 2026

(54) VEHICLE DOOR HANDLE ASSEMBLY ATTACHMENT UNIT

(71) Applicant: MINEBEA ACCESSSOLUTIONS FRANCE, Alfortville (FR)

(72) Inventor: Thomas Devernois, Creteil (FR)

(73) Assignee: MINEBEA ACCESSSOLUTIONS FRANCE, Alfortville (FR)

( * ) Notice: Subject to any disclaimer, the term of this patent is extended or adjusted under 35 U.S.C. 154(b) by 71 days.

(21) Appl. No.: 18/571,432

(22) PCT Filed: Jun. 16, 2022

(86) PCT No.: PCT/EP2022/066469

§ 371 (c)(1),
(2) Date: Dec. 18, 2023

(87) PCT Pub. No.: WO2022/268640

PCT Pub. Date: Dec. 29, 2022

(65) Prior Publication Data

US 2024/0254811 A1 Aug. 1, 2024

(30) Foreign Application Priority Data

Jun. 24, 2021 (EP) .................................... 21315109

(51) Int. Cl.
*E05B 79/06* (2014.01)
*E05B 85/10* (2014.01)

(52) U.S. Cl.
CPC .................................... *E05B 79/06* (2013.01)

(58) Field of Classification Search
CPC ........................... E05B 79/06; Y10T 292/0894
See application file for complete search history.

(56) References Cited

U.S. PATENT DOCUMENTS 4,566,350 A * 1/1986 Miyamoto .............. E05B 79/12
74/519
5,927,765 A * 7/1999 Austin ................ E05B 63/0065
292/229

(Continued)

FOREIGN PATENT DOCUMENTS

WO WO 03/008743 A2 1/2003

OTHER PUBLICATIONS

International Search Report Issued Sep. 28, 2022 in PCT/EP2022/066469, filed on Jun. 16, 2022, 3 pages.

*Primary Examiner* — Carlos Lugo
(74) *Attorney, Agent, or Firm* — Oblon, McClelland, Maier & Neustadt, L.L.P.

(57) ABSTRACT

A vehicle door handle assembly includes a housing, a bracket configured to attach the housing to a vehicle panel, and an attachment unit configured to attach the bracket and the housing together. The attachment unit includes a translation-mobile part mobile between an assembling position in which the bracket and the housing are attached together and a disassembling position in which the housing and the bracket are disassembled from each other. The attachment unit also includes a rotation-mobile part rotationally supported by the bracket, cooperating with the translation-mobile part and including a first cam surface configured to displace the translation-mobile part in the assembling position when the rotation-mobile part is put in rotation in a first rotational direction, and a second cam surface configured to displace the translation-mobile part in the disassembling position when the rotation-mobile part is put in rotation in a second rotational direction opposite to the first rotational direction.

20 Claims, 3 Drawing Sheets

(56) References Cited

U.S. PATENT DOCUMENTS

| | | | | |
|---|---|---|---|---|
| 6,578,446 | B2 * | 6/2003 | Staser | E05B 77/34 74/519 |
| 6,594,861 | B2 * | 7/2003 | Dimig | E05B 85/16 292/336.3 |
| 7,146,832 | B2 * | 12/2006 | Mathofer | E05B 79/06 292/DIG. 31 |
| 10,352,069 | B2 * | 7/2019 | Yamane | E05B 79/08 |
| 11,274,475 | B2 * | 3/2022 | Beck | E05B 85/06 |
| 11,280,117 | B2 * | 3/2022 | Beck | E05B 79/06 |
| 11,492,822 | B2 * | 11/2022 | Schnetter | E05B 81/00 |
| 2018/0187458 | A1 | 7/2018 | Beck et al. | |
| 2021/0095497 | A1 | 4/2021 | Bartels et al. | |

* cited by examiner

VEHICLE DOOR HANDLE ASSEMBLY ATTACHMENT UNIT

BACKGROUND OF THE INVENTION

Field of the Invention

The invention relates to a vehicle door handle assembly to control the opening of a vehicle door.

Description of the Related Art

A door panel is equipped with a handle in order to allow to open and close a door. This handle can be formed by a housing that sits flush against an outer panel of the vehicle. A user can introduce his hand into a housing of the handle in order to open the door.

The door can be opened thanks to an automated door latches selectively lock or release vehicle door panels in an automated fashion. By automated door latches are herein designated door latches where the user does not provide the energy to actuate the latch through grasping and moving a handle lever, knob or other.

Once the vehicle panel is released, the user or an electric panel actuator swings or slides the panel to grant physical access the vehicle. Automated door latches, under normal circumstances, do not require bulging handle levers on the exterior surface of the vehicle. The air drag of the vehicle can consequently be reduced, while the visual aspect of the vehicle can be streamlined.

A door panel (for example made of metal) is placed between the handle housing and a door handle assembly bracket. A gasket is placed between the housing edges and the door panel to ensure a sealing of this area. Furthermore, an attachment unit is placed on the side of the bracket opposite to the one placed against the door panel, the attachment unit comprising attachment means going through the bracket and the door panel to establish a connection with the handle housing.

Thus, the door panel is compressed between the handle housing and the bracket (and the gasket is compressed between the handle housing and the door panel).

In order to attach the attachment unit to the handle housing, it is necessary to slide this latter relative to the handle housing. The attachment means of the attachment unit can thus be attached to other means carried by the handle housing.

However, and even if the handle assembly can comprise elements that can make the assembling composed by the housing, the panel and the bracket easier, it could be difficult, when needed, to disassemble and reassemble this assembly.

BRIEF SUMMARY OF THE INVENTION

The purpose of the invention is therefore to provide a vehicle door handle assembly that make easier a assembling and a disassembling of the assembly composed by the bracket, the panel and the housing.

To that end, the invention concerns a vehicle door handle assembly comprising a housing, a bracket configured to attach the housing to a vehicle panel, and an attachment unit configured to attach the bracket and the housing together, the attachment unit comprising:

- a translation-mobile part mobile between an assembling position in which the bracket and the housing are attached together and a disassembling position in which the housing and the bracket are disassembled from each other,
- a rotation-mobile part rotationally supported by bracket, cooperating with the translation-mobile part and comprising a first cam surface configured to displace the translation-mobile part in the assembling position when the rotation-mobile part is put in rotation in a first rotational direction and a second cam surface configured to displace the translation-mobile part in the disassembling position when the rotation-mobile part is put in rotation in a second rotational direction opposite to the first rotational direction.

Thanks to this configuration, a simple rotation of one part of the attachment unit allows to assemble or disassemble the handle assembly.

A first rotation of the rotation-mobile part allows to attach the housing, the panel and the bracket together. Furthermore, and if a disassembling is needed, a simple rotation in a direction opposite to the first one allows to release the above cited parts from each other.

The first cam surface and the second cam surface can be developed on different plans with regard to the rotation axis of the rotation-mobile part.

The rotation-mobile part can comprise a third cam surface developed on a further plan with regard to the rotation axis of the rotation-mobile part and the first and second cam surfaces, the third cam surface having at least two recesses configured to cooperate with an indexing pawn carried by the bracket, the first recess corresponding to the assembling position and the second recess corresponding to the disassembling position. This locking device ensures to hold the translation-mobile part in the assembling or disassembling position without risking any unwanted displacement.

The indexing pawn can be carried by a U-shaped lever realized in one piece with the bracket. Thus, the rotation-mobile part is guided in its rotation by the U-shaped lever that ensures the cooperation between the recesses and the guiding pawn.

The translation mobile part can comprise two upstanding control surfaces, the first cam surface being configured to cooperate with a first control surface to displace the translation-mobile part in the assembling position upon rotation of the rotation mobile part in said first rotational direction and the second cam surface being configured to cooperate with a second control surface to displace the translation-mobile part in the disassembling position upon rotation of the rotation mobile part in said second rotational direction. This configuration is an illustration of the transformation of a rotation movement into a translation movement. The attachment unit corresponds to an excenter.

The rotation-mobile part can comprise a screw mark at an end of its rotation axis. This allows putting this part in rotation in a very simple way.

The rotation-mobile part can comprise two arcuate grooves and the bracket comprises a guiding pawn configured to slide into the arcuate grooves when the rotation-mobile part is put in rotation in the first or in the second direction. This configuration allows a good guiding of the rotation-mobile part during its rotation.

The arcuate grooves can be separated by a solid part forming a stop for the guiding pawn.

The rotation axis of the rotation-mobile part can comprise a clippable end configured to cooperate with a cylinder realized in one piece with the bracket. This is a very simple way to attach this part on the bracket.

The translation-mobile part can comprise hooks and the housing can comprise holes, the hooks being configured to be placed into the holes when the translation-mobile part is in the assembling position.

The bracket comprises guiding hooks configured to guide the translation-mobile part. These guiding hooks form guiding means ensuring a good translation of the translation-mobile part.

BRIEF DESCRIPTION OF THE FIGURES

The invention will be better understood in view of the following description, referring to the annexed Figures in which.

DETAILED DESCRIPTION

Figure 1:
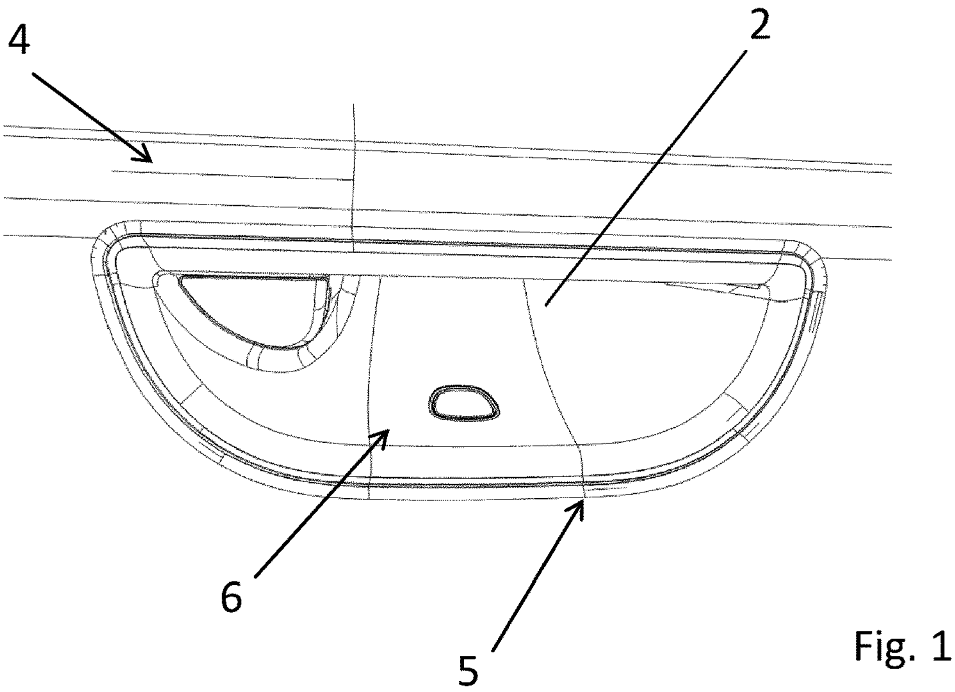
FIG. 1 is a front view of a door panel and a vehicle door handle assembly according to the invention.

A vehicle door panel 4 and a vehicle door handle assembly 2 are shown on FIG. 1.

Figure 2:
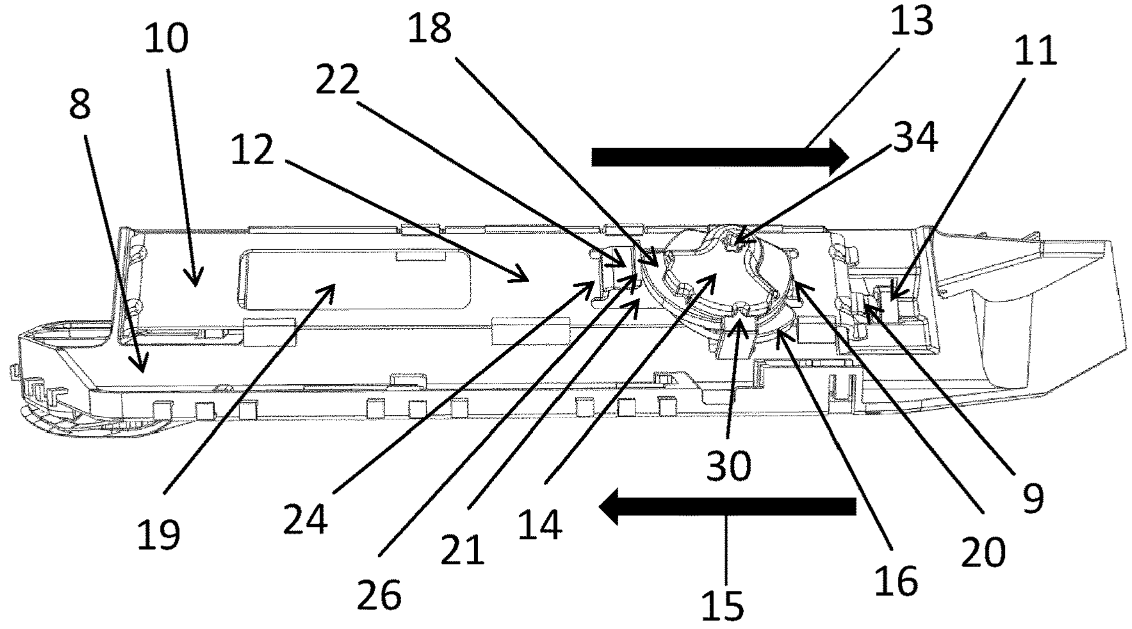
FIG. 2 is a backside view of a vehicle door handle assembly according to the invention in a disassembling position.

The vehicle door handle assembly 2 is disposed in an opening 5 of the vehicle door panel 4 and comprises a housing 6 (on its outer face) and a bracket 8 (on its inner face—see FIG. 2). The housing 6 which can be mounted form outside the door cooperated through the opening the panel 4 with the bracket 8. As explained below, the bracket 8 allows, thanks to an attachment unit 10, to attach the vehicle door handle assembly 2 to the panel 4. A gasket is compressed between the edges of the housing 6 and the panel 4 in order to allow a sealing between those two elements. This construction leads to the placement of the handle assembly 2 on each sides of the panel (one side with the housing 6 and the other side with the bracket 8).

As shown on FIG. 1, a trim element (not shown) can be placed at the junction of the panel 4 and the housing 6.

A user can introduce his hand into the housing 6 in order to interact with an actuation switch (not shown on the figures) generating an electrical signal to be sent to a vehicle opening element controller to release the vehicle opening element. This actuation switch can be electrical or mechanical. The electrical switch has the advantage, compared to a mechanical switch, of saving space in the door assembly as it there is no need to provide room required by the stroke of a mechanical part to be displaced (this space is needed with a mechanical switch wherein a flap is displaced to generate the electrical signal).

The electrical signal generated is able to displace the opening element latch. The actuation switch can also be equipped with NFC and/or RFID readers. Furthermore, the actuation switch can be attached on the bracket 8 and can be equipped with at least one reinforcement bar to protect the actuation switch against an excessive actuation effort.

The attachment unit 10 can be placed on the face of the bracket 8 opposite to the face placed against the panel 4 and crosses the bracket 8 and the panel 4 (which is placed between the bracket 8 and the housing 6) to interact with the housing 6 via hooks 9 introduced into holes 11 carried by the housing 6. This allows a compression of the assembly bracket 8/panel 4/gasket/housing 6 together.

More precisely, and when the attachment unit 10 has crossed the bracket 8 and the panel 4, a translation-mobile part 12 can slide relative to the housing 6 in order to allow an entrance of the hooks 9 into the holes 11. The holes are preferably placed on both sides of the housing 6 following a longitudinal axis of this latter.

The attachment unit 10 comprises a translation-mobile part 12 mobile between an assembling position in which the bracket 8 and the housing 6 are attached together and a disassembling position (illustrated on FIGS. 2 and 3) in which the housing 6 and the bracket 8 are disassembled from each other. The attachment unit 10 also comprises a rotation-mobile part 14 comprising a first cam surface 16 configured to displace the translation-mobile part 12 in the assembling position when the rotation-mobile part 14 is put in rotation in a first rotational direction 13 (for example the clockwise direction) and a second cam surface 18 configured to displace the translation-mobile part 12 in the disassembling position when the rotation-mobile part 14 is put in rotation in a second rotational direction 15 opposite to the first rotational direction (for example the counterclockwise direction).

In other words, the rotation of the rotation-mobile part 14 allows a translation of the translation-mobile part 12 in a first or in a second direction, depending to the rotation direction of the rotation-mobile part 14.

Figure 3:
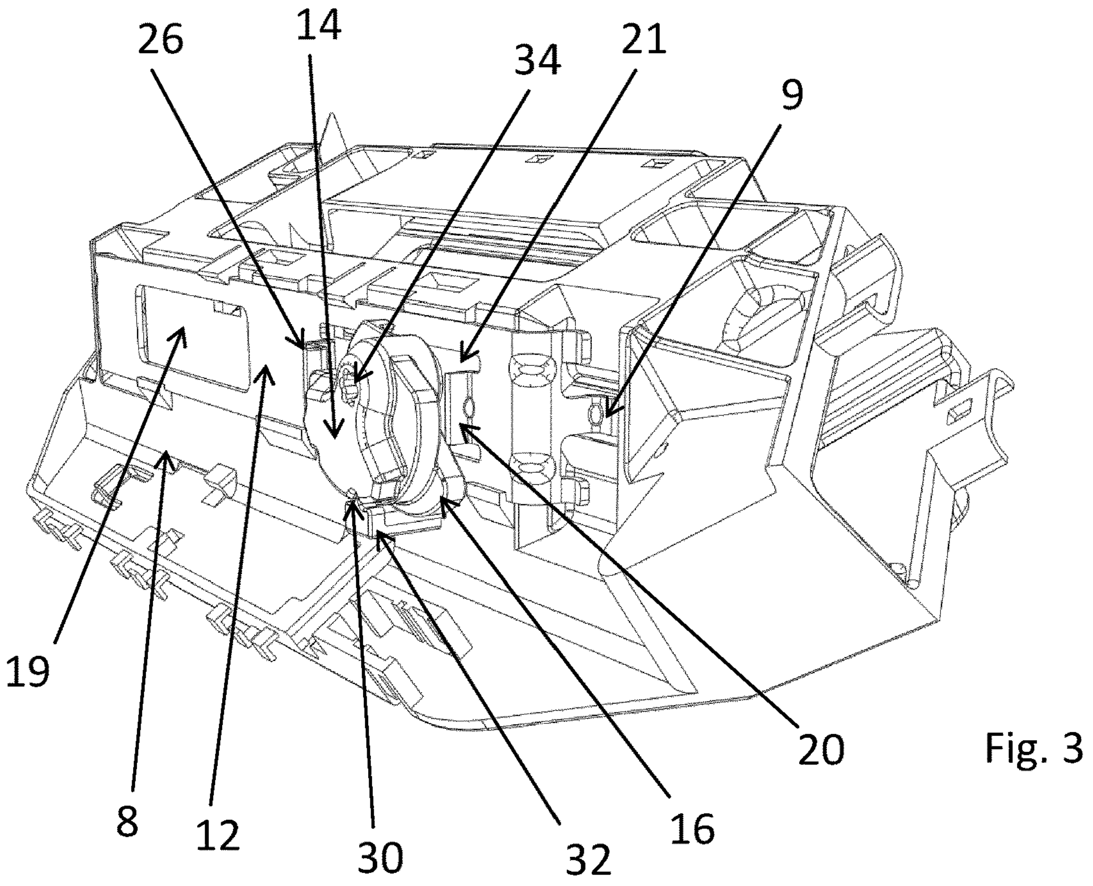
FIG. 3 is a tilted perspective backside view of the vehicle door handle assembly similar to that of FIG. 2.

The translation-mobile part 12 can be made of metal and can comprise some recesses, for example two recesses on FIGS. 2 and 3. A first recess 19 can be made on the translation-mobile part 12 in order to make this latter lighter. Furthermore, a second recess 21 is realized in order to place the rotation-mobile part 14 to the bracket 8.

Figure 4:
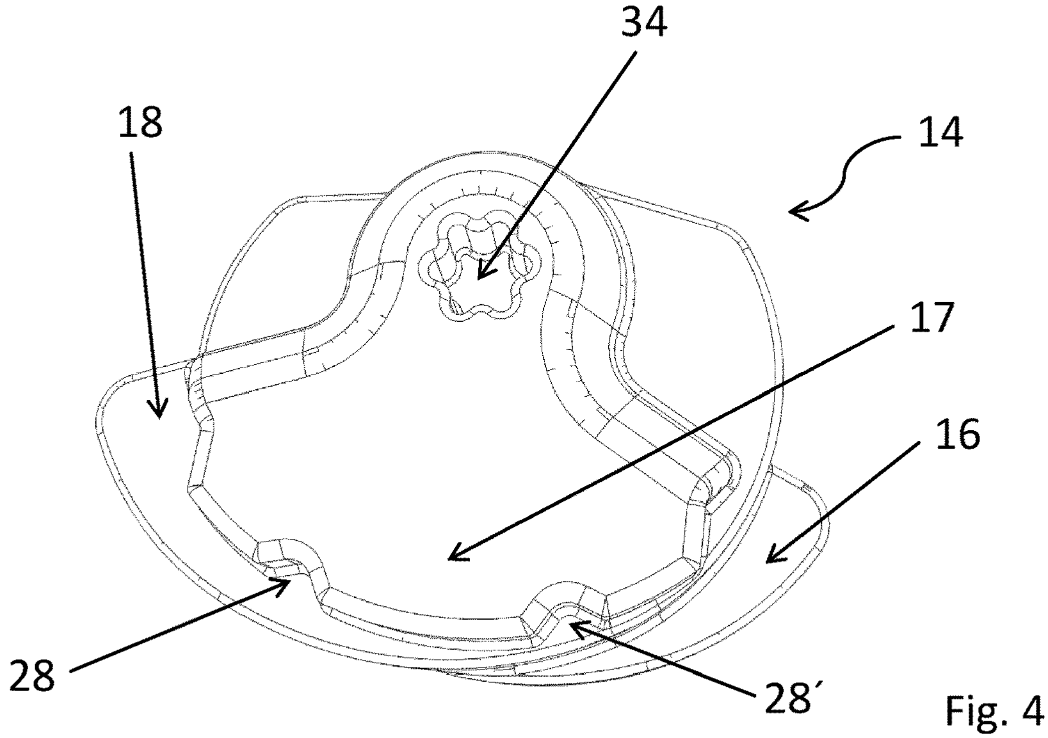
FIG. 4 is a backside view of a rotation-mobile part according to the invention.

Preferably, and in order to allow a transformation of a rotation into a translation, the bracket 8 can comprise two upstanding control surfaces 20 and 22 (see for example FIG. 4), the first cam surface 16 being configured to cooperate with a first upstanding control surface 20 carried by the translation-mobile part 12 to displace the translation-mobile part 12 in the assembling position and the second cam surface 22 being configured to cooperate with a second upstanding control surface 22 carried by the translation-mobile part 12 to displace the translation-mobile part 12 in the disassembling position.

Such a configuration is illustrated on FIG. 2. The second cam surface 18 is in contact with the second upstanding control surface 22 and the translation-mobile part 12 is placed in the disassembling position. The rotation-mobile part 14 can be put in rotation in the first rotational direction 13. Thus, the second cam surface 18 and the second upstanding control surface 22 are not in contact anymore. When the rotation stroke is sufficient, the first cam surface 16 comes in contact with the first upstanding control surface 20 and, during the end of the rotation-mobile part 14 stroke, the translation-mobile part 12 is displaced in the assembling position with the hooks 9 inserted into the holes 11.

As shown on FIGS. 2 and 3, the first upstanding control surface 20 has a height insufficient to be in contact with the second cam surface 18 (only the first cam surface 16 can be in contact with the first upstanding control surface 20).

Furthermore, the second upstanding control surface 22 has a shape allowing only to the second cam surface 18 to be in contact with this latter. More precisely, the second upstanding control surface 22 comprises a base part 24 sufficient remote to the rotation-mobile part 14 to not be touched by the first cam surface 16 and an upper end 26 closer to the rotation-mobile part 14 than the base part 24 and that can be in contact with the second cam surface 18. In other words, the base part 24 forms a recess allowing the first cam surface to pass under the upper end 26 without touching the second upstanding control surface 22.

The rotation-mobile part 14 can comprise at least two recesses 28 and 28' (illustrated on FIG. 4) configured to cooperate with an indexing pawn 30 carried by the bracket 8 to place the translation-mobile part 12 in respectively the assembling position and the disassembling position. Indeed, and in the example illustrated on FIG. 2, the translation-mobile part 12 is placed into the disassembling position thanks to the rotation-mobile part 14 and its second cam surface 18 in contact with the second upstanding control surface 22. In this configuration, the indexing pawn 30 extend into the recess 28' and place the rotation-mobile part 14, and consequently the translation-mobile part 12, in the disassembling position. After a full stroke of the rotation-mobile part 14 in the rotational direction 13 in order to displace the translation-mobile part 12 in the assembling position, the indexing pawn 30 enters into the recess 28 to place the attachment unit 10 in the assembling position. This ensures a good stability to the attachment unit 10.

The indexing pawn 30 can be carried by a U-shaped lever 32 in which the rotation-mobile part 14 is placed (see FIG. 3). This ensures than this latter has no risk to displace in a direction parallel to the rotation axis and any risk of a wrong interaction between the two cam surfaces 16 and 18 and the two upstanding control surfaces 20 and 22. In other words, the U-shaped lever 32 is a guiding element of the rotation-mobile part 14 when this part is put in rotation.

The rotation-mobile part 14 can comprise a screw mark 34 at an end of its rotation axis. This screw mark 34 can be a Torx mark as illustrated on FIGS. 2 and 3. This constitutes a simple way to put the rotation-mobile part 14 in rotation and consequently to assemble and disassemble the bracket 8 with the housing 6. Of course, the form of the screw mark 34 could be different than the from the Torx form. Other means could be used, for example a pawn that can be gripped by a clamp.

Figure 5:
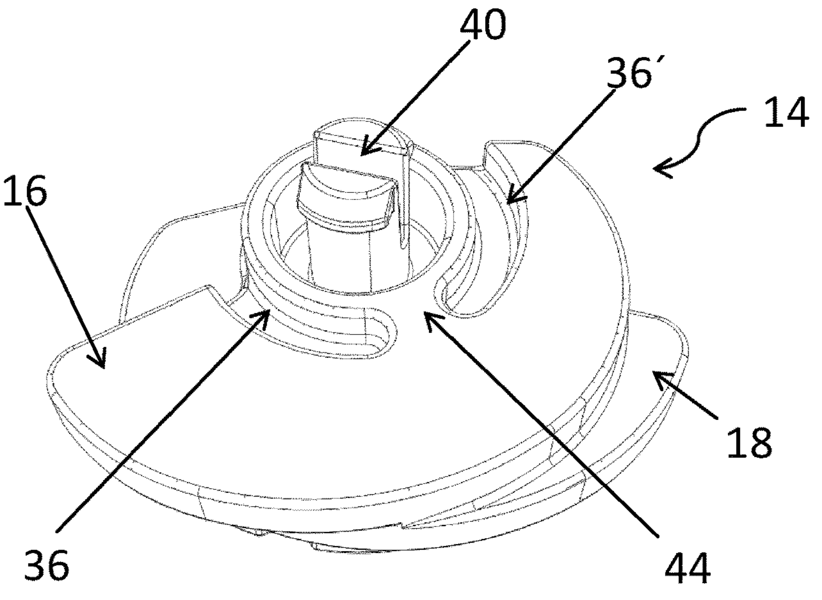
FIG. 5 is a frontal view of a rotation-mobile part according to the invention.
Figure 6:
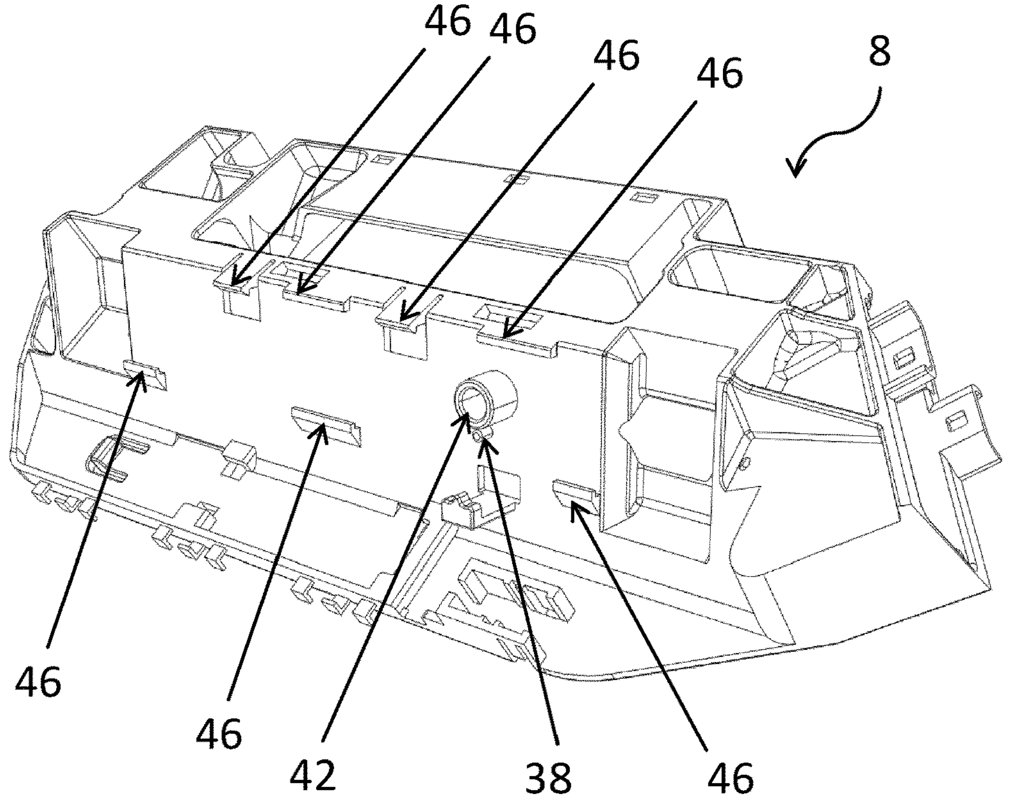
FIG. 6 is a backside view of the bracket according to the invention.

As illustrated on FIGS. 5 and 6, wherein the rotation-mobile part can comprise two arcuate grooves 36 and 36' and the bracket 8 can comprise a guiding pawn 38 configured to slide into the arcuate grooves 36 and 36' when the rotation-mobile part 14 is put in rotation in the first or in the second direction. The arcuate grooves 36 and 36' form other guiding means for the rotation-mobile part 14.

Furthermore, the arcuate grooves 36 and 36' can be separated by a solid portion 44 (illustrated on FIG. 5), the solid portion 44 forming an end stop for the guiding pawn 38. In other words, the solid portion 44 forms a travel stop for the guiding pawn 38 at the end of each arcuate groove 36 and 36'. This stop corresponds preferably to a configuration in which the indexing pawn 30 extends into one of the recesses 28 and 28'. Thus, the solid portion 44 prohibits an overtravel of the rotation-mobile part 14.

Preferably, the rotation-mobile part 14 is clipped on the bracket 8. This is a simple to attach this part. As illustrated on FIG. 5, the rotation-mobile part 14 can comprise a clippable end 40, here forming by two deformable semi-cylinders. This clippable end 40 can be introduced into a cylinder 42 formed on the bracket 8 (see FIG. 5), for example moulded with it. The two ends of the clippable end 40, are placed on the upper end of the cylinder 42 and maintain the rotation-mobile part 14 attached to the bracket 8.

The bracket 8 can comprise several guiding hooks 46, the translation-mobile part 12 being placed into these guiding hooks 46. The guiding hooks 46 extend along sidewalls of the translation-mobile part 12, each guiding hook 46 comprising an end extending above the translation-mobile part 12. Thanks to this configuration, the translation-mobile part 12 is guided by the guiding hooks 46 during a translation in an assembling or in a disassembling position.

LIST OF REFERENCES

2: door handle assembly
4: panel
5: door panel opening
6: housing
8: bracket
9: hooks
10: attachment unit
11: holes
12: translation-mobile part
13: first rotational direction
14: rotation-mobile part
15: second rotational direction
16: first cam surface
17: third cam surface
18: second cam surface
19: first recess
20: first upstanding control surface
21: second recess
22: second upstanding control surface
24: base part
26: upper end
28, 28': recesses
30: indexing pawn
32: U-shaped lever
34: screw mark
36, 36': grooves
38: guiding pawn
40: clippable end
42: cylinder
44: solid part
46: guiding hooks

The invention claimed is:

1. A vehicle door handle assembly, comprising:

a housing;

a bracket configured to attach the housing to a vehicle panel; and an attachment unit configured to attach the bracket and the housing together, wherein the attachment unit includes a translation-mobile part mobile between an assembling position in which the bracket and the housing are attached together and a disassembling position in which the housing and the bracket are disassembled from each other, and a rotation-mobile part rotationally supported by the bracket, cooperating with the translation-mobile part and comprising a first cam surface configured to displace the translation-mobile part in the assembling position when the rotation-mobile part is put in rotation in a first rotational direction, and a second cam surface configured to displace the translation-mobile part in the disassembling position when the rotation-mobile part is put in rotation in a second rotational direction opposite to the first rotational direction, and the first cam surface and the second cam surface are developed on different planes with regard to a rotation axis of the rotation-mobile part.

2. The vehicle door handle assembly according to claim 1, wherein the translation-mobile part comprises two upstanding control surfaces, the first cam surface is configured to cooperate with a first control surface of the two upstanding control surfaces to displace the translation-mobile part in the assembling position upon rotation of the rotation-mobile part in said first rotational direction, and the second cam surface is configured to cooperate with a second control surface of the two upstanding control surfaces to displace the translation-mobile part in the disassembling position upon rotation of the rotation-mobile part in said second rotational direction.

3. The vehicle door handle assembly according to claim 1, wherein the rotation-mobile part comprises a screw mark at an end of a rotation axis of the rotation-mobile part.

4. The vehicle door handle assembly according to claim 1, wherein a portion of the rotation-mobile part extending parallel to a rotation axis of the rotation-mobile part comprises a clippable end configured to cooperate with a cylinder made in one piece with the bracket.

5. The vehicle door handle assembly according to claim 1, wherein the translation-mobile part comprises hooks, the housing comprises holes, and the hooks are configured to be placed into the holes when the translation-mobile part is in the assembling position.

6. The vehicle door handle assembly according to claim 1, wherein the bracket comprises guiding hooks configured to guide the translation-mobile part.

7. A vehicle door handle assembly, comprising:

a housing;

a bracket configured to attach the housing to a vehicle panel; and an attachment unit configured to attach the bracket and the housing together, wherein the attachment unit includes a translation-mobile part mobile between an assembling position in which the bracket and the housing are attached together and a disassembling position in which the housing and the bracket are disassembled from each other, and a rotation-mobile part rotationally supported by the bracket, cooperating with the translation-mobile part and comprising a first cam surface configured to displace the translation-mobile part in the assembling position when the rotation-mobile part is put in rotation in a first rotational direction, and a second cam surface configured to displace the translation-mobile part in the disassembling position when the rotation-mobile part is put in rotation in a second rotational direction opposite to the first rotational direction, the rotation-mobile part comprises a third cam surface developed on a further plane with regard to a rotation axis of the rotation-mobile part and the first and second cam surfaces, and the third cam surface has at least two recesses configured to cooperate with an indexing pawn carried by the bracket, a first recess of the at least two recesses corresponding to the assembling position and a second recess of the at least two recesses corresponding to the disassembling position.

8. The vehicle door handle assembly according to claim 7, wherein the indexing pawn is carried by a U-shaped lever made in one piece with the bracket.

9. The vehicle door handle assembly according to claim 7, wherein the translation-mobile part comprises two upstanding control surfaces, the first cam surface is configured to cooperate with a first control surface of the two upstanding control surfaces to displace the translation-mobile part in the assembling position upon rotation of the rotation-mobile part in said first rotational direction, and the second cam surface is configured to cooperate with a second control surface of the two upstanding control surfaces to displace the translation-mobile part in the disassembling position upon rotation of the rotation-mobile part in said second rotational direction.

10. The vehicle door handle assembly according to claim 7, wherein the rotation-mobile part comprises a screw mark at an end of a rotation axis of the rotation-mobile part.

11. The vehicle door handle assembly according to claim 7, wherein the rotation-mobile part comprises a clippable end configured to cooperate with a cylinder made in one piece with the bracket.

12. The vehicle door handle assembly according to claim 7, wherein the translation-mobile part comprises hooks, the housing comprises holes, and the hooks are configured to be placed into the holes when the translation-mobile part is in the assembling position.

13. The vehicle door handle assembly according to claim 7, wherein the bracket comprises guiding hooks configured to guide the translation-mobile part.

14. A vehicle door handle assembly, comprising:

a housing;

a bracket configured to attach the housing to a vehicle panel; and an attachment unit configured to attach the bracket and the housing together, wherein the attachment unit includes a translation-mobile part mobile between an assembling position in which the bracket and the housing are attached together and a disassembling position in which the housing and the bracket are disassembled from each other, and a rotation-mobile part rotationally supported by the bracket, cooperating with the translation-mobile part and comprising a first cam surface configured to displace the translation-mobile part in the assembling position when the rotation-mobile part is put in rotation in a first rotational direction, and a second cam surface configured to displace the translation-mobile part in the disassembling position when the rotation-mobile part is put in rotation in a second rotational direction opposite to the first rotational direction, the rotation-mobile part comprises two arcuate grooves, and the bracket comprises a guiding pawn configured to slide into the arcuate grooves when the rotation-mobile part is put in rotation in one of the first rotational direction and the second rotational direction.

15. The vehicle door handle assembly according to claim 14, wherein the arcuate grooves are separated by a solid part forming a stop for the guiding pawn.

16. The vehicle door handle assembly according to claim 14, wherein the translation-mobile part comprises two upstanding control surfaces, the first cam surface is configured to cooperate with a first control surface of the two upstanding control surfaces to displace the translation-mobile part in the assembling position upon rotation of the rotation-mobile part in said first rotational direction, and the second cam surface is configured to cooperate with a second control surface of the two upstanding control surfaces to displace the translation-mobile part in the disassembling position upon rotation of the rotation-mobile part in said second rotational direction.

17. The vehicle door handle assembly according to claim 14, wherein the rotation-mobile part comprises a screw mark at an end of a rotation axis of the rotation-mobile part.

18. The vehicle door handle assembly according to claim 14, wherein the rotation-mobile part comprises a clippable end configured to cooperate with a cylinder made in one piece with the bracket.

19. The vehicle door handle assembly according to claim 14, wherein the translation-mobile part comprises hooks, the housing comprises holes, and the hooks are configured to be placed into the holes when the translation-mobile part is in the assembling position.

20. The vehicle door handle assembly according to claim 14, wherein the bracket comprises guiding hooks configured to guide the translation-mobile part.

* * * * *